Sept. 11, 1956  J. A. ADLOFF  2,762,236
GEAR SHIFT MECHANISM FOR TRANSMISSIONS
Filed Aug. 30, 1950  2 Sheets-Sheet 1
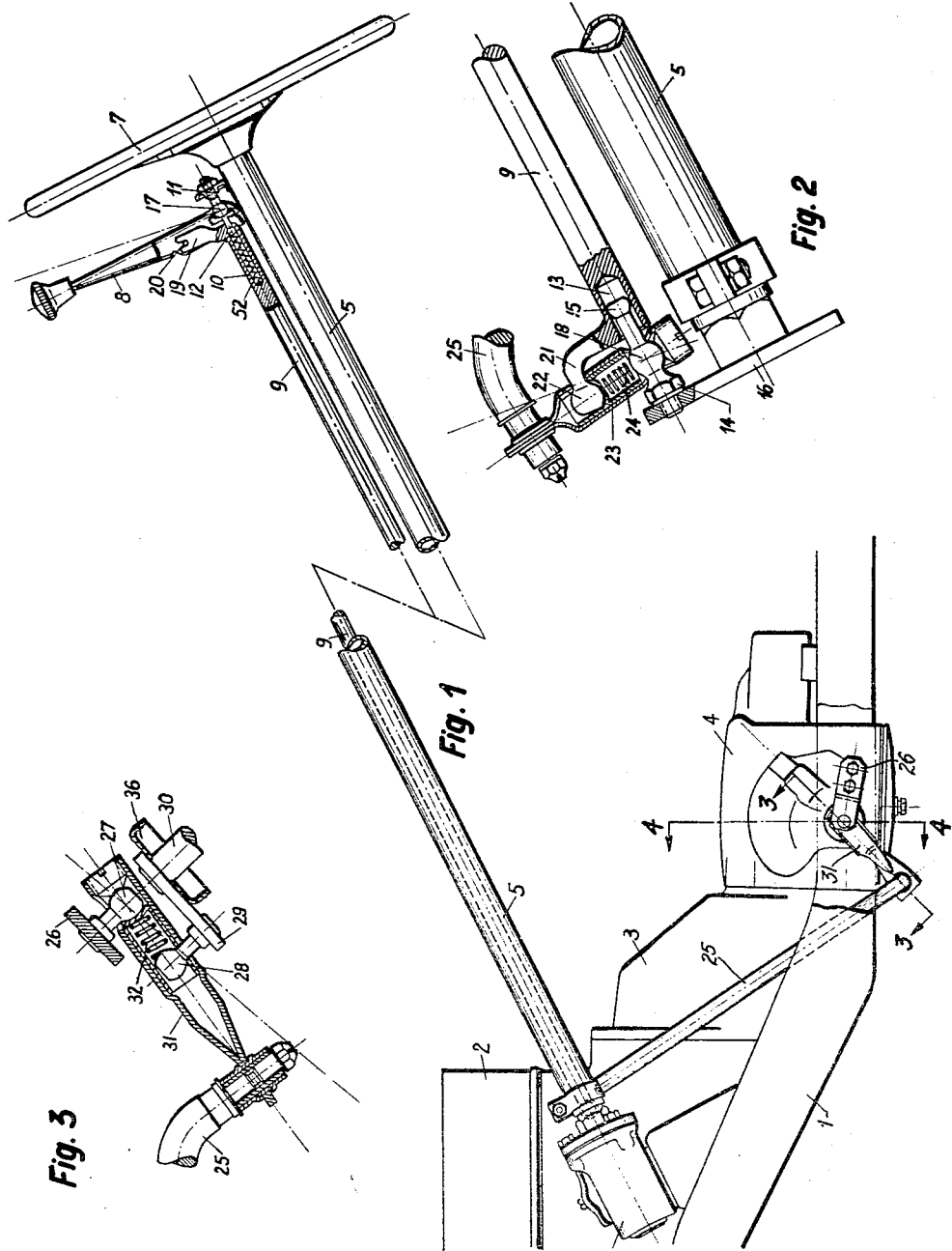
Inventor
Jacob A. Adloff
By Willits Helmig Baillio
Attorneys Sept. 11, 1956 J. A. ADLOFF 2,762,236
GEAR SHIFT MECHANISM FOR TRANSMISSIONS
Filed Aug. 30, 1950 2 Sheets-Sheet 2

Inventor
Jacob A. Adloff
By Willits, Helwig & Baillio
Attorneys

United States Patent Office 2,762,236
Patented Sept. 11, 1956

2,762,236

GEAR SHIFT MECHANISM FOR TRANSMISSIONS

Jakob August Adloff, Mainz-Gonsenheim, Germany, assignor to General Motors Corporation, Detroit, Mich., a corporation of Delaware Application August 30, 1950, Serial No. 182,259

Claims priority, application Germany August 30, 1949

12 Claims. (Cl. 74—477)

This invention relates to an improvement of the gear shift mechanism for transmissions in which the shifting of gears is accomplished by axial displacement and rotation of a control rod placed parallel to the steering column. The control rod is actuated by a hand lever which is located preferably just under the steering wheel. The shift movement is transmitted to change gears in the transmission by links which transfer the motion of the control rod to the transmission housing and which shift the gears or synchronizing clutches. The advantage of this mechanism consists in the convenient accessibility of the shift lever and in the increase of leg room through elimination of the conventional lever. Gear shift mechanism of this type are known. It is one object of this invention to simplify the various component parts of the mechanism so that the complete mechanism is of lighter weight and can be more economically manufactured and assembled than the gear shift mechanism of this type known heretofore.

In this invention the control rod, actuated by the hand lever is slidably and rotatably mounted on guide pins, which are rigidly connected to the steering column and the steering gear housing respectively. The ends of the control rod are cranked, the upper end being forked and embracing a pin in the hand lever, while the lower end, bent like a finger, projects into a socket within a movably mounted sheath.

Attached to this sheath is the upper end of a connecting link transmitting the shifting movement to the transmission. Another sheath similar in construction to the aforementioned one is movably mounted on a ball stud, which is rigidly connected to the transmission housing. Into a socket of this latter sheath intrudes another ball stud, which cooperates with the axially and rotatably displaceable shift bar. The shift bar is borne in a boss of the side wall of the transmission housing and has a driving pin which engages either the shift segment controlling first and reverse gears or the shift segment controlling second and third gears. The shift segment which is not engaged by the shift bar is locked by a ball which is held in a cake located between the hub of the shift segment and the shift spindle, when the ball enters a radial bore within the hub of the shift segment, thus securing the shift segment against rotatable movement together with the shift bar. The lock ball of the shift segment which is engaged with the shift bar dodges in a ring groove of the shift bar.

Further details of the invention will be understood from the following specifications and the accompanying drawings illustrating an embodiment of the invention wherein:

Figure 1 is a plan view of the entire gear shift mechanism in which the upper part including the steering hand wheel is turned by 90 degrees.

Figure 2 is the lower end of the control rod partly shown in section.

Figure 3 shows a cross section along line 3—3 and

Figure 4:
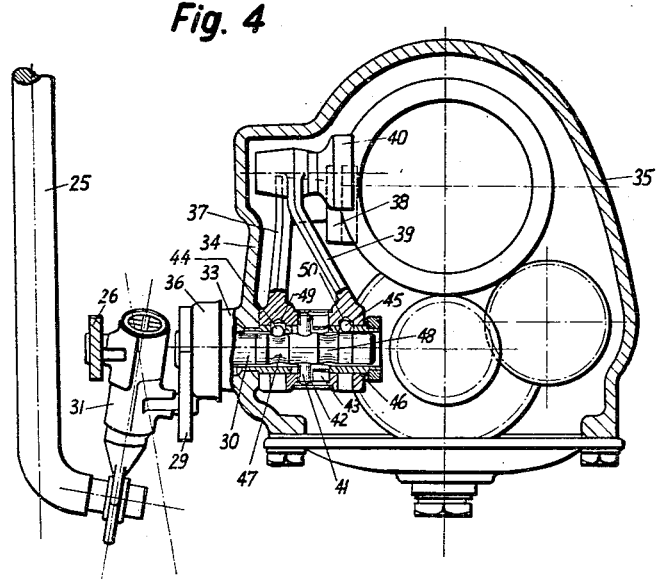
Figure 4 is a cross section along line 4—4 of Figure 1.

In Figure 1, the frame or chassis side rail of a motor vehicle is designated by 1 while 2 represents the engine, 3 the clutch housing and 4 the transmission assembly. The steering column 5 is attached at its lower end to the steering gear box 6 which is fixed to the chassis side rail 1.

In the steering column 5 the steering shaft is housed which connects the worm of the steering gear with the handwheel 7. Located parallel to the steering column 5 is the axially displaceable and rotatably mounted control rod 9. The upper end of the control rod 9 is journalled with its axial bore 10 on a guide pin 11 having an upset end 12 and is rigidly attached to the steering column 5, while the lower end of the control rod journals on a similar guide pin 14 having an upset head 15 and is fixed in the steering gear box 6. The guide pins 11 and 14 have intermediate their ends ball shaped enlargements 17, 18 respectively. The ball 17 of the upper guide pin 11 provides a fulcrum for the hand lever 8. The upper end of the control rod 9 is bent at right angle ending in a forked bearing 19 for the bearing pin 20 of hand lever 8 thus connecting control rod 9 and hand lever 8.

The lower end of control rod 9 (Figure 2) is cranked resembling a bent finger 21 which ends in a ball 22. The ball 22 and the ball 18 of guide pin 14 together with the sheath 23 form a joint transmitting the movements of the hand lever 8 to the connecting link 25, which is fixed to the sheath 23. When the control rod 9 is axially displaced in selecting a change speed group, ball 22 will travel on a straight line, while the sheath 23 performs a circular motion about ball 18 as a center, this will cause a slight variation in the distance of the centers of ball 18 and 22 which is compensated by spring 24. When selecting the desired speed gear hand lever 8 is performing a side to side motion causing a limited rotary or oscillatory motion of control rod 9. In this operation the lower end of control rod 9 and its cranked end portion, finger 21 and ball 22, will rotate or oscillate sheath 23 and connecting link 25 about ball 18 of guide pin 14 as a center.

Connecting link 25 transmits these movements to the shifting mechanism of the transmission. A bracket 26, in which a ball stud 27 is fixed, is rigidly attached to the transmission housing (Figure 3). Another ball stud 28 is connected to shift bar 30 by a link 29. The balls of the two studs 27 and 28 together with the transmission end of connecting link 25 and sheath 31 form a joint which is identical in construction to joint 18, 22, 24 at the steering column end. To compensate for variations in the distance between the balls 27 and 28 in selecting the speed group, spring 32 is interposed between the balls 27 and 28.

The shift bar 30 (Figure 4) rests within a sleeve 46 in the boss 33 of side wall 34 of the transmission housing and is rotatably or oscillatably and axially displaceable therein. 36 represents a dust cap which is provided between link 29 and an offset on shift bar 30. On the end which intrudes into the transmission housing shift bar 30 carries the shift levers 37 and 39 which operate the sliding gears by pawls 38 and 40. A dog pin 41 couples shift bar 30 with shift levers 37 or 39 respectively. To this end the shift levers are provided with slots 42 and 43 in a collar of their hubs which the dog pin engages. When dog pin 41 engages one of the shift levers, the other shift lever is locked. The locking device consists of balls 44 and 45 respectively which are held in a sleeve provided between shift bar 30 and each one of the shift levers. The shift bar 30 has also two ring grooves 47 and 48 which are spaced at a distance which is smaller than the distance of the balls 44 and 45 by the travel of the shift bar when selecting the speed group. Inside the hubs of shift levers 37 and 39 there is a radial bore 49 and 50 into which either ball 44 or 45 will enter and lock the shift lever against rotation.

Figure 5:
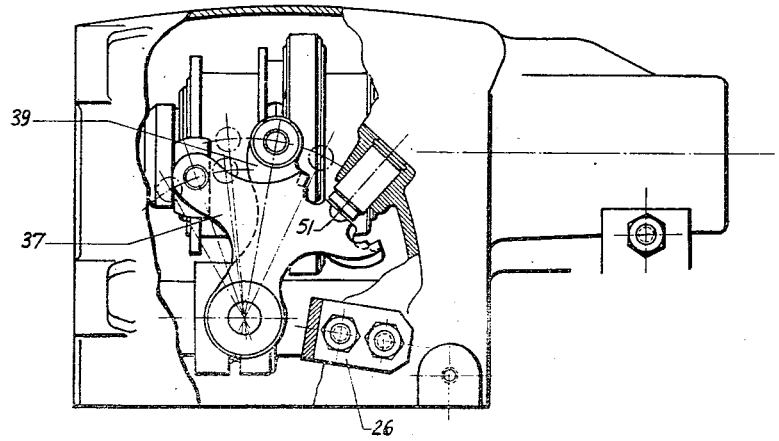
Figure 5 is a side view of the transmission wherein the side wall is broken away.

The individual gears are locked in a conventional manner by spring actuated balls 51 (Figure 5) which engage notches of the shift levers 37 and 39.

In Figures 1 to 5 all the various shift elements are shown in the position which they will have in selecting speed group for third and second gear. This position will be automatically selected by the mechanism under the action of spring 52 located in bore 10 of control rod 9, when gears are not meshed.

In case first or reverse gear is to be selected, hand lever 8 must be moved towards hand wheel 7 displacing controd rod 9 axially in upward direction.

Finger 21 with ball 22 at the lower end of control rod 9 rotates or oscillates the sheath 24 and connecting link 25 about ball 18.

Transmitted to the transmission end of the connecting link 25 this movement causes a rotation or oscillation of sheath 31 about ball 27 displacing ball 28 and shift bar 30 axially. Dog 41 engages slot 43 of shift lever 39 and so couples shift lever 39 and shift bar 30. At the same time ball 44 is lifted by shoulder on shift bar 30 and pushed into bore 49 of shift lever 37 locking it against rotation. When hand lever 8 is now moved about guide pin 11, i. e. control rod 9 is rotated about its axis, sheath 24 and connecting link 25 perform a circular movement about the axis of guide pin 14. Connecting link 25 transmits this movement to sheath 31 at the transmission end of the connecting link and causes it to perform a circular movement about the axis of ball stud 27. Hereby shift bar 30 is rotated or oscillated and shift lever 39 actuated to select first or reverse gear.

I claim:

1. In a transmission control mechanism a controd rod supported for rotary and reciprocating control movement on fixed guide pins, a sheath connecting said rod to one end of a link, and a second sheath connecting the other end of the link to a shift bar supported by the transmission housing for rotatable and axial control movement, to rotate said shift bar when said control rod is rotated, and to displace said shift bar axially when said control rod is reciprocated.

2. In a transmission control mechanism a control rod mounted for axial and rotatable displacement on fixed guide pins, one end of the rod being bent to engage a hand lever pivoted on a ball formed on one of the guide pins, so that axial pivotal movement of the hand lever about the guide pin reciprocates the control rod while rotatable displacement of the hand lever rotates the control rod.

3. In a transmission control mechanism a pair of controlled members supported by a sleeve supporting a shift bar for rotatable and axial displacement, a dog pin fixed in said shift bar to selectively engage one of the control members upon axial displacement of the shift bar, two spaced grooves in said shift bar to receive a locking ball of the selected control member, so that upon engagement of one control member by said dog pin, the selected control member and shift bar are connected for rotatable displacement while the free control member is locked against rotary displacement with the sleeve supporting the shift bar.

4. In a transmission control mechanism a control rod supported for rotary and reciprocating control movement on fixed guide pins, a sheath connecting said rod to one end of a link and a second sheath connecting the other end of the link to a shift bar supported by the transmission housing for rotatable and axial displacement, a pair of controlled members, and means for selecting and operating said controlled members, so that reciprocating of the control rod displaces the shift bar axially to select the controlled member, and rotation of the control rod rotates the shift bar to operate the selected controlled member.

5. In a transmission control mechanism, a support member, a pair of controlled members rotatably mounted on said support member, a shift bar mounted on said support member for axial and rotary control movement, means connecting said shift bar and said controlled members to select one of said controlled members in response to axial movement of said shift bar and to actuate said selected control member in response to rotary movement of said shift bar, and means responsive to said selective axial movement of said shift bar operably connected to the other of said controlled members to lock said other controlled member against rotation.

6. In a transmission control mechanism, a tubular support member, a pair of controlled members rotatably mounted on said tubular support member, a shift bar mounted within said tubular support member for axial and rotary control movement, and means connecting said shift bar and said controlled members to select one of said controlled members in response to axial movement of said shift bar and to actuate said selected control member in response to rotary movement of said shift bar.

7. In a transmission control mechanism, a tubulr support member, a pair of controlled members rotatably mounted on said tubular support member a shift bar mounted within said tubular support member for axial and rotary control movement, means connecting said shift bar and said controlled members to select one of said controlled members in response to axial movement of said shift bar and to actuate said selected control member in response to rotary movement of said shift bar, and means responsive to said selective axial movement of said shift bar operably connected to the other of said controlled members to lock said other controlled member against rotation.

8. In a transmission control mechanism, a support, guids pins fixed on said support, a control rod supported for rotary and reciprocating control movement on said guide pins fixed on said support, a control rod supported to one end of said link, a shift bar supported by a transmission housing for rotatable and axial control movement, and a second member connecting the other end of said link to said shift bar to rotate said shift bar when said control rod is rotated and to axially displace said shift bar when said control rod is reciprocated.

9. In a transmission control mechanism, a support, guide pins fixed on said support, a control rod mounted on said guide pins, a lateral projection at one end of said control rod, a hand lever pivotally mounted on one of said pins for axial pivotal and rotary pivotal control movement, a pivotal connection between said projection and said hand lever to translate axial pivotal movement of said hand lever into axial movement of said control rod and rotary pivotal movement of said hand lever into axial movement of said control rod.

10. In a transmission control mechanism, a support, guide pins fixed on said support, a control rod supported for rotary and reciprocating control movement on said pins, a laterally projecting arm on each end of said control rod, a control lever pivoted to one of said pins for axial pivotal and rotary pivotal movement, said control lever being connected to one of said projecting arms to translate axial pivotal movement of said control lever to axial movement of said rod and rotary pivotal movement of said control lever to rotary movement of said rod, a controlled lever pivoted on the other pin for axial pivotal and rotary pivotal movement, and said controlled lever being connected to the other of said projecting arms to translate axial movement of said rod to axial pivotal movement of said controlled lever and rotary movement of said rod to rotary pivotal movement of said controlled lever.

11. In a transmission control mechanism, a support, guide pins fixed on said support, a control rod supported for rotary and reciprocating control movement on said guide pins, a link, a first member pivoted to said support and connecting said rod to one end of said link, a transmission housing, a shift bar supported by said transmission housing for rotatable and axial control movement, and a second member pivoted to said transmission housing and connecting the other end of said link to said shift bar to rotate said shift bar when said control rod is rotated and to axially displace said shift bar when said control rod is reciprocated.

12. In a transmission control mechanism, a housing having a support portion, a pair of controlled members rotatably mounted on said support portion, an axially and rotatably displaceable shift bar supported by said support portion coaxially with said controlled members, and shift means operatively connecting said shaft bar and said controlled members to selectively engage one controlled member to said shift bar to actuate said one controlled member in response to rotatable movement of said shift bar, and locking means contacting said shift bar and said controlled members to lock the other controlled member to the housing in response to axial displacement of said shift bar.

References Cited in the file of this patent

UNITED STATES PATENTS

| | | |
|---|---|---|
| 2,170,794 | Chayne | Aug. 29, 1939 |
| 2,180,579 | Butzbach | Nov. 21, 1939 |
| 2,328,227 | Orr | Aug. 31, 1943 |
| 2,350,506 | Haigh | June 6, 1944 |
| 2,377,700 | Kurtz | June 5, 1945 |
| 2,497,930 | Creson | Feb. 21, 1950 |